Figure 1:
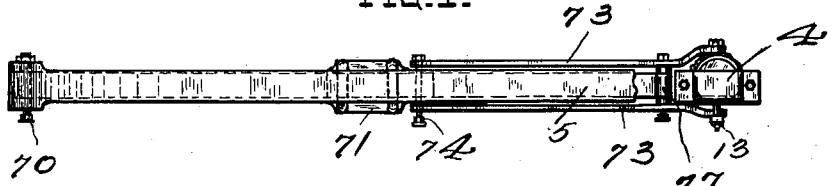

W. L. OSTENDORF.
PNEUMATIC SPRING FOR VEHICLES OR SHOCK ABSORBERS.
APPLICATION FILED JAN. 15, 1912.

1,113,370.

Patented Oct. 13, 1914.

3 SHEETS—SHEET 1.

WITNESSES:
W. A. Hirtle
C. K. Davies

INVENTOR.
W. L. OSTENDORF
BY
Thomas A. Hanner
ATTORNEY.

W. L. OSTENDORF.
PNEUMATIC SPRING FOR VEHICLES OR SHOCK ABSORBERS.
APPLICATION FILED JAN. 15, 1912.
1,113,370.
Patented Oct. 13, 1914.
3 SHEETS—SHEET 2.
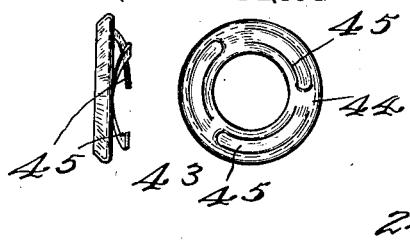
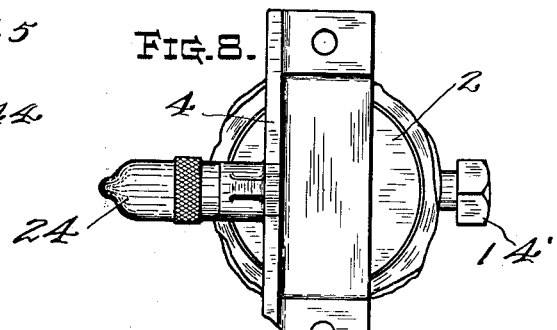
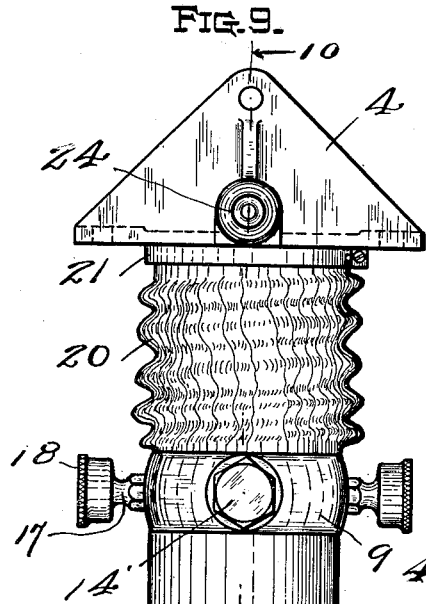
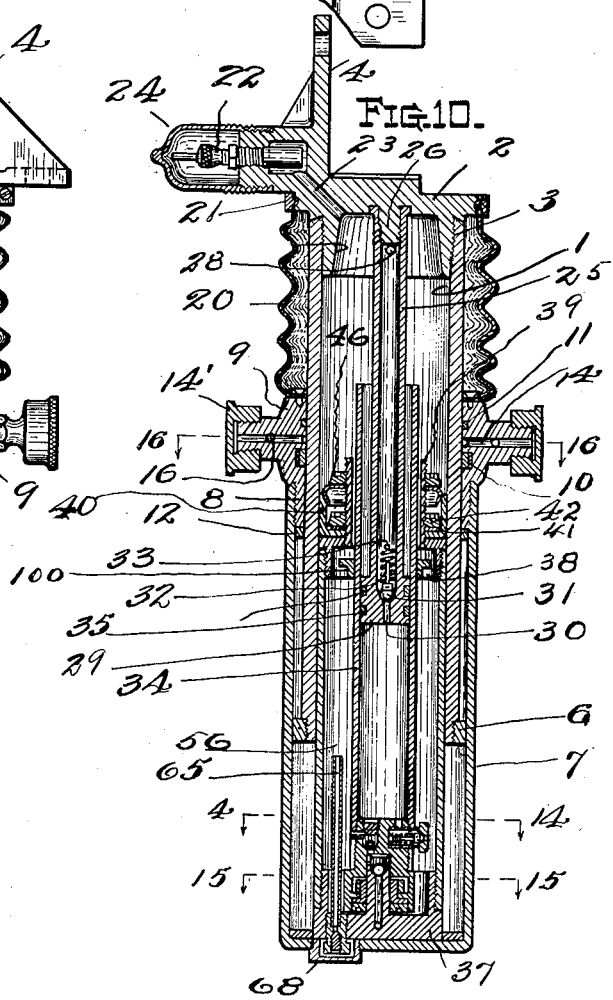
WITNESSES:
INVENTOR.
W. L. OSTENDORF
BY
ATTORNEY.

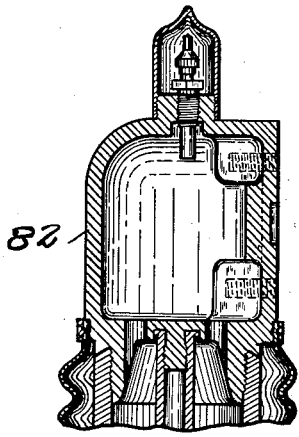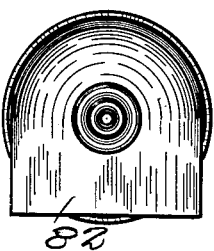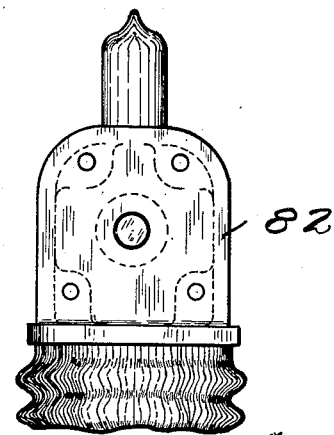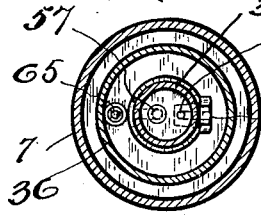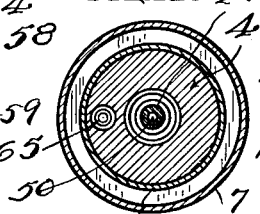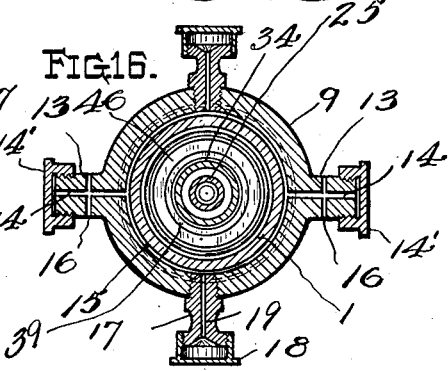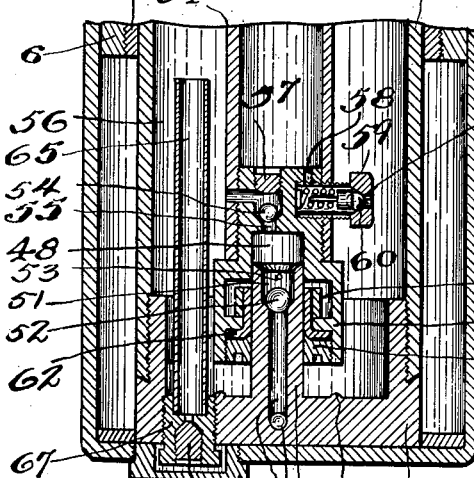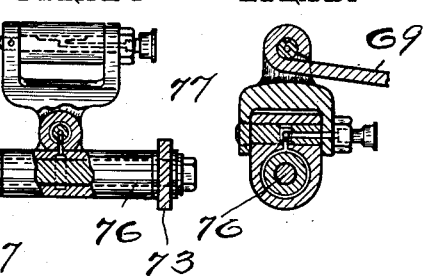

UNITED STATES PATENT OFFICE.

WILHELM L. OSTENDORF, OF WILKINSBURG, PENNSYLVANIA, ASSIGNOR OF ONE-THIRD TO ALBERT HERMAN KLESA AND ONE-THIRD TO FRANK P. SCOTT, BOTH OF WILKINSBURG, PENNSYLVANIA.

PNEUMATIC SPRING FOR VEHICLES OR SHOCK-ABSORBERS.

1,113,370.  Specification of Letters Patent.  Patented Oct. 13, 1914.

Application filed January 15, 1912. Serial No. 671,241.

*To all whom it may concern:*

Be it known that I, WILHELM L. OSTENDORF, a citizen of the United States, residing at Wilkinsburg, in the county of Allegheny and State of Pennsylvania, have invented certain new and useful Improvements in Pneumatic Springs for Vehicles or Shock-Absorbers, of which the following is a specification.

The present invention relates to improvements in shock absorbers, and is specially designed for use on auto-vehicles.

The primary object of the invention is the embodiment of a resilient suspension or support, including a liquid, pneumatic pressure cushioning device, which is adapted for use in lieu of, or with, the customary steel springs and pneumatic tires commonly in use.

The invention is applicable to the frame and springs of auto-vehicles of standard construction without any change or alteration in the frame, and is of course well adapted, and specially designed for newly constructed auto-vehicles, such as motor trucks, carriages, delivery wagons, and on railway rolling stock, and other vehicles.

The invention consists essentially in the novel arrangement of telescoping tubes which contain a compressible medium as air, and an incompressible medium consisting of a viscous liquid, as glycerin and soap, combined with a high and a low pressure pump for restoring the mediums to normal conditions.

In the accompanying drawings I have illustrated one example of the physical embodiment of my invention constructed according to the best mode I have so far devised for the practical application of the principles, and I have also illustrated two forms of applying the invention for use on automobiles.

Figures 1, 2, 3, 6, 7, 8, 9, 10, 14, 15 and 16, set forth a construction which may preferably be applied to the front suspension of automobiles; Figs. 18 and 19 illustrate a shackle or hanger applied either in the front or rear, and Figs. 4, 5, 11, 12, and 13, illustrate the invention, as it may be applied to the rear suspension of an automobile.

For convenience, hereinafter, I shall refer to the invention as applied to the vehicle designated by the broad term automobile, but it will be understood that this limitation is only for convenience of description.

Figure 2:
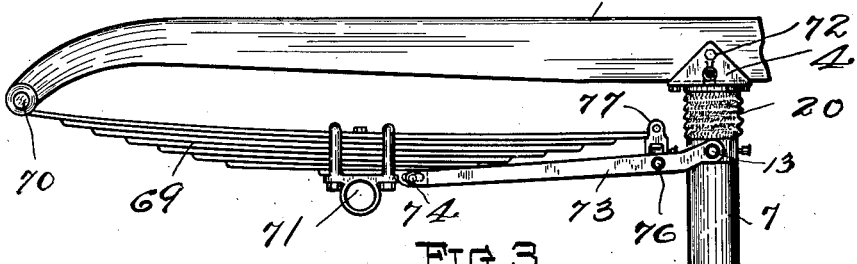
Figure 3:
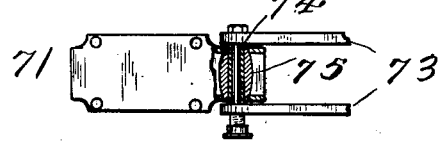
Figure 4:
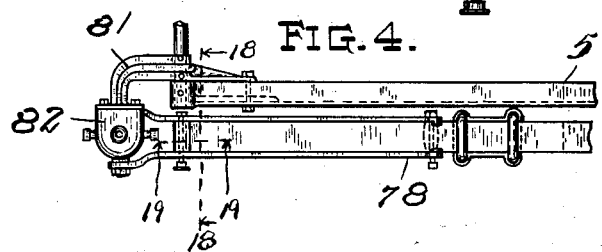
Figure 5:
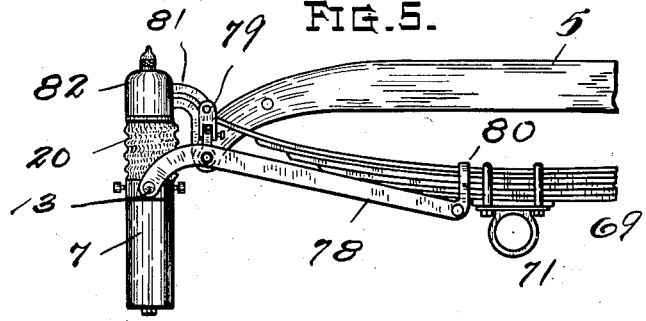

In the drawings: Fig. 1 is a top plan view of so much of an automobile frame, as is necessary to illustrate the application thereto of my invention. Fig. 2 is a side elevation of Fig. 1 showing a front end of a frame, a leaf spring, and the shock absorbing device connecting said frame and spring. Fig. 3 is an enlarged detail sectional view of a joint in Fig. 2, to compensate for and take up movement of the vehicle, when one wheel is higher than the opposite. Fig. 4 is a top plan view of the rear suspension, with my invention applied. Fig. 5 is a side elevation of Fig. 4. Figs. 6 and 7 are respectively, a side view and a face view, of a spring and expanding cone for the sliding joint packing, between the telescoping parts of the invention. Fig. 8 is a top plan view of the device as applied in Fig. 1. Fig. 9 is a side elevation. Fig. 10 is a vertical or axial section on line 10—10 in Fig. 9. Fig. 11 is a sectional view showing the domed cylinder head, adapted for attachment at the rear of the automobile. Fig. 12 is a top plan view of Fig. 11. Fig. 13 is a side elevation of Fig. 11. Fig. 14 is a section on line 14—14 Fig. 10. Fig. 15 is a section on line 15—15 Fig. 10. Fig. 16 is a section on line 16—16, Fig. 10. Fig. 17 is an enlarged vertical sectional view of the lower end of the device, showing the low pressure pump in lifted position. Figs. 18 and 19 are respectively, sectional views enlarged, on lines 18—18 and 19—19, Fig. 4.

Referring particularly to sheets 2 and 3 of the drawing, the preferred embodiment of my invention includes the cylinder 1, the upper end of which is closed by the head 2, the parts being threaded together as at 3. This head has integrally formed therewith the angle bracket 4, for attachment to the frame 5 of a vehicle. The lower end of the cylinder 1 is open, but upon its exterior, at the end, a stop ring 6 is threaded, which is in contact with and adapted to slide along the interior wall of the bearing tube 7 which incases the lower portion of the cylinder 1. The tube 7 is closed at its lower end, but its upper end is open and threaded onto the depending flange 8 of a bearing ring 9 which encircles the cylinder 1, packing rings, which may be of the elastic type, being employed as designated at 10 and 11 to form a packed slidable joint. A buffer ring 12 surrounds the cylinder 1 adjacent the flange 8, and this ring is adapted to receive and cushion any excessive shock of the stop ring 6, in the event of an excess stroke movement.

The bearing ring 9 is provided with a pair of diametrically arranged bearing bosses 13, 13, through each of which bosses extends a duct 14, and these ducts 14, which are closed at their outer ends by the caps 14', connect, at their inner ends with an annular lubricating groove 15 in the inner wall of the bearing ring 9. Transverse ducts 16 in the bosses or bearing lugs 13 intersect these ducts 14, and furnish lubricating material, as grease for the outer surface of the lugs or bosses, while the groove ring 15 lubricates the bearing between the cylinder 1 and the bearing ring 9. A pair of grease cups 17, closed by their respective caps 18, supply the lubricant to the groove 15 through ducts 19, 19. At the upper side of the bearing ring 9 is attached the lower end of a boot or cover 20, and the upper end of the boot is attached, as by ring 21, to the head 2 of the cylinder 1. This boot is of leather or other flexible material, and is designed to protect the incased cylinder and other parts, against dust, mud, etc.

As seen more clearly in Fig. 10, the cylinder head 2 is provided with an air valve 22, through which air is forced by way of passage 23, into the interior of the cylinder 1. An ordinary air pump may be used for this purpose, after detaching the cap 24, and by use of another suitable pump, liquid may also be introduced into the interior of the cylinder 1, for the purpose to be described. There are two pumping mechanisms located within the telescoping device, and the plunger of one of these pumps is formed by the tube 25, threaded at its upper end to the boss 26 which depends from the head 2, and adjacent this threaded connection is an opening or orifice 28. At the lower end of the tubular plunger, which I term the high pressure pump plunger, is formed a head 29, through which extends an axial passage 30, closed at one end by a ball valve 31 whose stem is encircled by a coiled spring 32, which bears at one end against a pin 33, and at the other end, urges the valve 31 to closed position over the end of the passage 30. This plunger is adapted to reciprocate within the high pressure pump cylinder 34, the packing rings 35 insuring a close fit. The tube 36 which I term the piston tube, is provided with a head 37 screwed thereto at the lower end of the bearing cup 7, and at the upper end of the tube is threaded to a flanged ring 38 which is integral with the sleeve 39 that encircles the tube 34. The piston tube has a sliding fit in the cylinder 1, and the flanged ring 38 and sleeve 39 are provided with a leather packing cup 40, which is secured to the ring by means of a washer 41 and nut 42 threaded on the sleeve. To further increase the effectiveness of this joint and to render the sliding joint air tight and liquid tight, I provide a combination spring and expanding device which comprises a metallic cone 43 (see Figs. 6 and 7) located above the nut 42 and bearing down and outwardly against the interior flaring end of the leather cup 40. The ring 43 is open at its center, but its upper solid face 44 is provided with a series of circularly arranged springs or metallic tongues 45, struck up from the body of the material, and against which the clamp nut 46 bears. Tightening of the nut 46 forces the leather packing cup against the inner walls of the cylinder 1 to make an air and fluid tight joint.

Located above the piston head 37, and adapted to rest thereon is the head 47 of the high pressure pump cylinder 34. As clearly seen in Fig. 17, the head is threaded into the lower interiorly threaded end of the cylinder 34, and is bored out to form an axially extending chamber 48 which fits over and incases an upstanding boss 49 of the head 37. This boss forms the plunger for the low pressure pump, and as clearly shown is bored out forming a passage 50 which expands at the upper end into a chamber 51 communicating with the chamber 48. A ball valve 52 is located in the chamber 51, its movement being limited by the pin 53, to close the open end of the passage 50. A second ball valve 54 normally closes the angular passage 55 which forms communication between the chamber 48 and the space 56 within the tube 36, and this ball valve is confined within its limits by means of the spherical end screw plug 57. Communication between the interior of the high pressure pump cylinder 34, and the chamber 56 of the piston tube 36 is also regulated and controlled, through the passage 58 and hollow screw plug 59, by means of a spring pressed valve 60 which is adapted to occupy the valve seat 61 at the open end of the plug head. The joint between the plunger 49, and the head 47 is packed by means of a leather cup washer 62, contracting spring 63, and the clamp nut 64 as will be readily understood. To determine and regulate the quantity of fluid in the chamber or space 56, a gage tube 65 is employed. This tube is open at its upper end, but its lower end is closed by a screw plug 66 threaded into an interiorly threaded plug 67 which is screwed into the head 37, and the whole is protected by a screw cap 68.

Referring now to Figs. 1, 2, and 3, the manner of applying the device to an automobile frame will be disclosed. For convenience I have referred to this mode as that employed for the front of an automobile, and Figs. 4 and 5 as the rear suspension, but it will be understood that the parts are interchangeable and well adapted for either use. Assuming the frame 5 and the spring 69 which are pivoted as usual at 70, and the bearing yoke 71, to be of the usual equipment, my cushioning device is attached by means of the bolts 72 and bracket 4 to the frame bar 5, and the bearing bosses 13 receive the perforated ends of the links 73, which, at their other ends are connected to the bearing yoke 71 by means of the coupling bolt 74. A roller 75 (Fig. 3) is provided to take up rocking movement of a vehicle, when one wheel is higher than the opposite wheel. The inner end of the spring 69 is pivotally connected to the links 73 at point 76 by means of the shackle or hanger 77 (see also Figs. 18 and 19).

In the modification in Figs. 4, 5, 11, 12, 13, referring to Figs. 4 and 5, the application of the device is shown as modified for attachment to the rear of the automobile, wherein the links 78, which are shackled at 79, similarly as at 77 in Fig. 2, are attached at 80 to the spring 69. A bracket arm 81 connects the frame bar 5 with the modified chambered or domed cylinder head 82. The slight or minor changes otherwise involved in this modification will be understood and need not be pointed out in detail.

The method best adapted for filling the pneumatic device, is to withdraw all air therefrom, through air valve 22, then to completely collapse or close the telescoping parts 1 and 7, after which the gage plug 66 is removed. Fluid substance, as glycerin and soap, may then be introduced into the cylinder 1 through valve 22, filling the space around tube 34 above the packed joint, then the fluid overflows through the space between the sleeve 39 and tube 34 into the liquid storage space or chamber 56, until the top of the gage pipe is reached. The appearance of the liquid and its flow through said pipe and open plug 67, indicate that a sufficient quantity has been placed in the tube 36. The plug 66 is now replaced, and air is now pumped through the valve 22 until the telescoping parts are about half distended, or to a pressure suitable to meet particular requirements as may be determined by experiment and actual test. Under these conditions it will be understood that the upper portion of the device including the cylinder 1 above the packed joint, and the interior of the tubular plunger 25 are filled with compressed air, as is also the space in chamber 56 above the incompressible fluid. Now assuming that the device absorbs a shock occasioned as the vehicle travels over a rough road, it will readily be seen that upon the upstroke of the cylinder 1 and plunger 25, the upward movement of the plunger head 29 expands and reduces the pressure in tube 34 below the plunger head. This reduced pressure above the head 47, permits the fluid under pressure under the head 47 to lift said head and tube 34 bodily, to position seen in Fig. 17, and the movement is limited only by collar 100 on the tube 34. The effectiveness of this movement is insured and enhanced by the presence of the lugs or protuberances 37' on the head 37 which provide a space between the underside of the plunger head and the upper face of the piston head, for the initial movement of pressure under the plunger. The distance of this movement may be regulated to meet existing conditions by adjusting the stop collar 100 on the tube 34 with relation to the ring 38. The reduced pressure within the tube 34 also permits the introducion of fluid past valve 60 through passage 58 into the lower part of the tube 34. The down stroke of the parts will then cause this fluid to pass around ball valve 31 up through tube 25 and opening 28, into the interior of the cylinder 1 upon the top of the packed sliding joint, thus sealing the sliding joint in an air tight manner. The surplus fluid will then run over the top of the packed joint, down between the packing ring and tube 34 to its proper space. It should be understood that the spring pressed valve 60 is sufficiently strong to withstand pressure and remain closed until the tube 34 has moved upwardly to the position indicated in Fig. 17, before opening, and also strong enough to throttle sudden upward movements while taking in fluid. Spring 32 is of sufficient tension to allow passage of only enough liquid to throttle sudden downward movements and still retain liquid in the annular space above the packed joint, to keep the leather cup 40 well sealed against the interior of the cylinder walls 1. Liquid which should escape past the leather cup 40 of the sliding joint, into the lower end of the tube 7, at atmospheric pressure, is brought back to the storage space through radial channel 50' in the head 37, channel 50, past valve 52 into chambers 51 and 48, where it is held until the downstroke. The downstroke now causes the chambered head to close over the plunger 49 and forces the liquid from chambers 48 and 53 past the valve 54, and through the angular passage 55 to the liquid storage space 56.

There are many meritorious features involved in the above described device, among which may be mentioned the use of the combined elastic and expansible cone packing for the sliding joint between the telescopic members, which expander rigidly forces the packing into intimate contact with the cylinder walls. This conical expander is concentric with the axis of the cylinder and presses in a direction parallel with the axis, the pressure being regulated by the adjusting nut. It will be noted that the liquid above the packed sliding joint comes directly in contact with the leather packing cup 40, thereby sealing the joint and maintaining a liquid and air tight joint. The low pressure pump which restores surplus fluid that may find its way through the sliding joint, to the space 56, prevents the loss, or undesirable accumulation of fluid. The high pressure pump of which the tube 25 is the plunger, working within the cylinder 34 of the low pressure pump, permits the device to absorb sudden shocks or jerks of the reciprocating parts. The mechanism for attaching the shock absorber to the vehicle frame is clearly shown in the drawings, and no elaborate description is here necessary, but it should be understood that both forms of attachment illustrated, are applicable either to the front or to the rear suspension of automobiles. The attachment of the device to differing styles of frames of auto-vehicles will of course be varied to suit the existing conditions found, but the general principles of the invention will remain the same regardless of the manner of attaching the device.

From the above description taken in connection with the drawings it is believed I have provided a device which will fulfil the conditions set forth as the object of the invention, and while I have illustrated herein only one form of the essential features of my invention, it should be understood that I contemplate minor changes or alterations within the spirit of my appended claims, and without departing from the scope thereof.

Having thus fully described my invention, what I claim as new and desire to secure by Letters Patent is:—

1. The combination with a bearing tube and a piston tube of a cylinder telescoping between said parts, a packed sliding joint between said piston tube and cylinder, a pump plunger projecting from said cylinder and a cylinder for said plunger connected to said piston tube, and means for introducing and retaining compressed air in the cylinder above said packed joint and plunger.

2. The combination with a bearing tube and piston tube, of a cylinder telescoping between said parts, a sliding joint between said piston tube and cylinder, an inner tube connected with said piston tube, a plunger connected to said cylinder and having its head within said inner tube, a gaseous fluid above said joint and a liquid fluid below said joint, and means for restoring and retaining these mediums in normal condition.

3. The combination with a bearing tube, a piston tube and a cylinder, an open center head for said piston tube and a sliding joint between said head and cylinder, an inner tube connected to said piston tube, a plunger connected to the cylinder and having its head in said inner tube, there being fluid in said piston tube, and means whereby said fluid may pass through said inner tube and plunger head to seal said sliding joint.

4. The combination with a bearing tube, a piston tube with a fluid therein and a cylinder, of an open center head for said piston tube and a sliding joint between said head and cylinder, an inner tube connected to said piston tube and passed through said head, a plunger to the cylinder with its head in said inner tube, means whereby said fluid may be forced through said inner tube and plunger head to seal the sliding joint, and means for restoring such fluid as passes through said joint to its proper position.

5. The combination with a bearing tube, a piston tube with a fluid therein, and a cylinder with compressed air retained therein, of an open center head for said piston tube and a sliding joint between said head and cylinder, an inner tube connected with said piston tube and passed through said head, a plunger to the cylinder with its perforated and valved head in said inner tube, and a valve in the piston tube whereby fluid may be passed from said piston tube through said inner tube and perforated head to seal the sliding joint as described.

6. The combination with a bearing tube, a piston tube with a fluid therein, and a cylinder with compressed air retained therein, of an open center head for said piston tube, and a sliding joint between said cylinder and head, an inner tube connected with said piston tube and passed through said head, a plunger to the cylinder with its head in said inner tube, means for introducing said fluid through said inner tube and past said plunger head to seal the sliding joint, and passages in said piston tube and inner tube, controlled by valves for restoring excess fluid to its proper place.

7. The combination with a bearing tube and piston tube as described and with fluid in said piston tube, a head and plunger formed on said piston tube, an inner tube with a chambered head incasing said plunger and movable relatively thereto, and means for passing fluid from said bearing tube, through said heads and plunger, for the purpose described.

8. The combination with a bearing tube, and piston tube with fluid therein, a head and a plunger formed on said piston tube, an inner tube with a chambered head incasing said plunger and movable relatively thereto, passages through said heads and plunger, and valves for permitting the introduction of fluid from the bearing tube back to the piston tube for the purpose described.

9. The combination with a bearing tube and a piston tube, of a cylinder telescoping between said parts, a sliding joint between said cylinder and piston tube comprising a leather cup, a metallic cone bearing outwardly against the edge of said cup and formed with integral elastic spring tongues, and a clamping nut bearing on said tongues.

10. The combination with a bearing tube and piston tube with fluid therein, a head and a plunger formed on said piston tube, an inner tube with a chambered head incasing said plunger and movable relatively thereto, passages through said heads and plunger, valves for permitting the introduction of fluid from the bearing tube back to the piston tube, a gage tube projecting into said inner tube, a hollow plug secured in said chambered head communicating with the gage tube, and a screw plug closing the hollow plug.

11. The combination with a bearing tube and piston tube with fluid in said piston tube, a head and plunger formed on said piston tube, an inner tube with a chambered head incasing said plunger and movable relatively thereto, a gage tube located in said chambered head and opening through the bearing tube and means for closing said gage tube.

In testimony whereof I affix my signature in presence of two witnesses.

WILHELM L. OSTENDORF.

Witnesses:
W. A. HIRTLE,
JOHN F. SWEENY.